United States Patent
Zaidi

(12) 
(10) Patent No.: US 6,581,154 B1
(45) Date of Patent: Jun. 17, 2003

(54) EXPANDING MICROCODE ASSOCIATED WITH FULL AND PARTIAL WIDTH MACROINSTRUCTIONS

(75) Inventor: Nazar Zaidi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,660

(22) Filed: Dec. 31, 1999

Related U.S. Application Data

(60) Provisional application No. 60/120,396, filed on Feb. 17, 1999.

(51) Int. Cl.$^7$ .................................................. G06F 9/30
(52) U.S. Cl. .......................................... 712/210; 712/1
(58) Field of Search ............................. 712/1, 210, 212

(56) References Cited

U.S. PATENT DOCUMENTS

| | | | | |
|---|---|---|---|---|
| 5,113,503 A | * | 5/1992 | Sasaki et al. ................ | 712/212 |
| 5,220,656 A | * | 6/1993 | Itomitsu et al. ............. | 712/211 |
| 5,222,244 A | * | 6/1993 | Carbine et al. ............. | 712/209 |
| 5,438,668 A | * | 8/1995 | Coon et al. .................. | 712/204 |
| 5,481,684 A | * | 1/1996 | Richter et al. ................ | 703/26 |
| 5,673,427 A | * | 9/1997 | Brown et al. ................ | 712/212 |
| 5,905,893 A | * | 5/1999 | Worrell ....................... | 717/151 |
| 5,918,031 A | * | 6/1999 | Morrison et al. ........... | 712/208 |
| 5,930,508 A | * | 7/1999 | Faraboschi et al. ......... | 717/158 |

* cited by examiner

Primary Examiner—Eric Coleman
(74) Attorney, Agent, or Firm—Blakely, Sokoloff, Taylor & Zafman LLP

(57) ABSTRACT

A microarchitecture for dynamically expanding and executing microcode routines is provided. According to one aspect of the present invention, a mechanism expands a generic instruction into specific instructions at run-time, which may be employed to execute a computer program. These generic instructions use a special class of micro-ops (uops), called "super-uops" (or "Suops)" which are expanded into a variable number of regular (i.e., simple) uops. In one embodiment, the computer of the present invention utilizes a two-level decode scheme. The first-level decoder converts macro-instructions into either simple uops or one or more Suops, which represent a sequence of one or more simple uops. A second-level decoder is responsible for converting the Suops into the appropriate uop sequence based upon an indicator associated with the macro-instruction. An execution unit within the computer then executes the flow of uops generated by the first and second decoding units. The two-level decoding scheme of the present invention is advantageous in many ways. First, common microcode sequences, such as a packed add and a scalar add, can be collapsed into a single Suop. Depending upon how many uops are collapsed and how common the sequence is, the overall savings in silicon die area and microcode size can be very significant. By using a single Suop to represent both flows, and inserting the appropriate flow dynamically at decode time (based on the indicator associated with the macro-instruction), the total number of microcode flows which is written and stored within the computer is reduced considerably.

14 Claims, 4 Drawing Sheets

EXPANDING MICROCODE ASSOCIATED WITH FULL AND PARTIAL WIDTH MACROINSTRUCTIONS

This application claims the benefit of U.S. Provisional Application No. 60/120,396 filed Feb. 17, 1999, which is hereby incorporated by reference.

FIELD OF THE INVENTION

The invention relates generally to field of computer microarchitecture. More specifically, the invention relates to apparatus and methods for decoding and translating instructions that are executed within a microprocessor.

BACKGROUND OF THE INVENTION

The volume and complexity of data processed by today's personal computers are increasing exponentially, placing incredible demands on the computer's processor. New communications, games and "edutainment" applications feature video, 3D graphics, animation, audio and virtual reality, all of which demand ever-increasing levels of performance.

In light of the demands placed upon the processor, a technology called Single Instruction, Multiple Data (SIMD) was developed. This technology allows many pieces of information, or data elements, to be processed with a single instruction, providing parallelism that greatly increases performance.

To better appreciate the problem faced by researchers working in the field of computer design and architecture, one must first understand the basics of how instructions are processed within the machine. The architecture of many processors implement programmed instructions—often referred to as macro-instructions—by sequences of coded statements. In order for a macro-instruction to be acted on by the processor, it must be decoded into a sequence of micro-instructions or micro-operations (conveniently termed "micro-ops" or "uops") that can be executed by the processor's core logic.

The Katmai New Instruction Set (KNI), a processor instruction set developed by Intel Corporation, the assignee of the present invention, combines SIMD processing and the aforementioned use of macro-instructions. The underlying hardware implementation of a Katmai processor facilitates parallel operation on two sets of data elements simultaneously. KNI instructions, therefore, have packed, as well as, scalar versions of various operations. A scalar operation being one that operates on a single set of elements at a time, and a packed operation being one in which two or more sets of data elements are acted upon simultaneously. For example, In a packed version of the "add" instruction, multiple data elements of the two input operands may be added in parallel; whereas, in the scalar version of the "add" instruction, only one data element of each of the input operands is added at a time.

SIMD processing greatly increases processing speed by allowing multiple sets of data to be operated on simultaneously. It does carry the risk of increasing the amount of instruction translation information that must be stored by the processor in micro code ROM (also "ucode ROM" and "UROM"). For example, a uop for the scalar "Add" operation and another for the packed "Add" operation may need to be stored in the UROM. The requirement of larger UROM results in potentially greater fabrication costs and the larger UROM hinders the ability of the decoding process to be run at higher frequencies.

SUMMARY OF THE INVENTION

A method of processing data to multivariate instructions is disclosed and described herein. First, a macro-instruction for processing a particular set of data is decoded into a special micro-operation (micro-op). The special micro-op comprising a code sequence that is generic with regard to a set of multiple variant macro-instructions. An indicator associated with the special micro-op is also generated. The indicator indicates a particular variant of the set of multiple variant macro-instructions. Next, using the indicator, the special micro-op is converted into one or more micro-ops containing a code sequence that will perform the particular variant of the set of multiple variant macro-instructions as specified by the macro-instruction.

Other features and advantages of the invention will be apparent to one skilled in the art from the accompanying drawings and from the following detailed description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
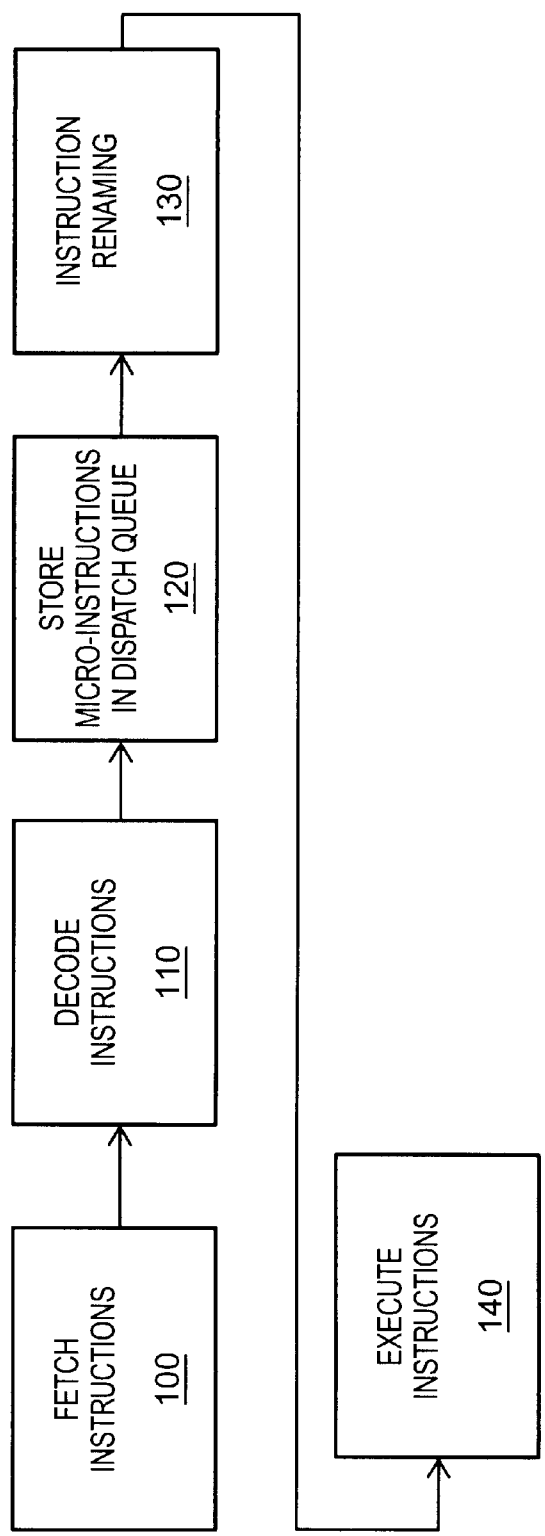
FIG. 1 is a diagram illustrative of an exemplary instruction fetch and execution cycle that may be utilized in the computer of the present invention.

A computer for dynamically expanding and executing microcode routines utilizing a multi-level decoder is disclosed. In the following description, numerous specific details (such as instruction types, indicator fields, bit sizes, etc.) are set forth in order to provide a thorough understanding of the present invention. However the present invention may be practiced without these specific details. In other instances, well-known methods, procedures, components, and circuits have not been described in detail.

As explained above, the primary problem in building a computer that incorporates both packed and scalar instructions is the increased silicon die area needed to store multiple sets of instructions (eg. an instruction set for a scalar operation and additional instruction sets for each possible packed operation). These instruction sets are typically stored in UROM but may also be programmed into one or more translation programmable logic arrays (XLAT PLAs). According to one aspect of the present invention, a "generic" Suop, generated from a macro-instruction, is expanded into specific uops at run-time. A macro-instruction is a word or acronym used in assembly language to represent a binary machine instruction operation code. Microcode represents one or more individual primitive operations which comprise the operation specified by a macro-instruction (i.e., macro-instructions may be decomposed into one or more individual operations or instructions). In this sense, microcode, in its basic form, is simply a collection of micro-operations (uops), where uops are individual instructions or syllables. A Super-uop (Suop), on the other hand, is a uop that can be expanded or transformed into one or more simple, or regular uops by expansion logic. According to an embodiment, one Suop can represent multiple packed and a scalar instructions. For example, operating under KNI, a packed add instruction, which operates on 128 bits of data simultaneously, and scalar add instruction, which operates on 64 bits of data simultaneously, are both represented by a single Suop code routine.

Using a single Soup code routine to represent packed and scalar instructions with similar functionality advantageously decreases the amount of silicon die area needed to store both sets of instructions in UROM (or in an alternative embodiment in XLAT PLAs). A smaller UROM facilitates the instruction decoding process to be run at higher frequencies. Smaller UROMs are also potentially less expensive to produce. Moreover, with only one Suop code routine representing packed and scalar versions of an instruction, more instructions can be stored in the same amount of UROM space. Plus, only a single microcode routine needs to be written (as opposed to two or more—packed routine(s) and a scalar routine), which results in code compaction, fewer errors, and fewer entry points in the UROM. Advantageously, the use of Suops to represent packed and scalar operations simplifies and shortens microcode development process.

Instruction Fetch-Decode-Execute Cycle

The operation of a processor is characterized by a fetch-decode-execute cycle. With reference to FIG. 1, an exemplary fetch and execution cycle will now be described. At block 100 of the cycle, the processor fetches an instruction from memory. The address of the fetched instruction is stored in an internal register such as a program counter (PC). As the processor is waiting for the memory to respond with the instruction, it increments the PC. This means the fetch phase of the next cycle will typically fetch the instruction in the next sequential location in memory (unless the PC is modified by a later phase of the cycle).

In block 110, the processor stores the information returned by the memory in another internal register, typically known as the instruction register, or IR. The IR holds a single machine instruction, encoded as a binary number, which an instruction decoder decodes into a series of one or more uops or Suops.

At step 120, the uops and Suops created in block 110 are stored in a FIFO (first in, first out) dispatch queue. A uop or Suop exits the queue when the processor is ready to execute the instruction contained in the uop or Suop.

In instruction execution stage 140, the processor actually carries out the instruction. This step often requires further memory operations; for example, the instruction may direct the processor to fetch two operands from memory, add them, and store the result in a third location (the addresses of the operands and the result are also encoded as part of the instruction). At the end of this phase the processor starts the cycle over again by entering the fetch phase for the next instruction.

Instruction Decoder

Figure 2:
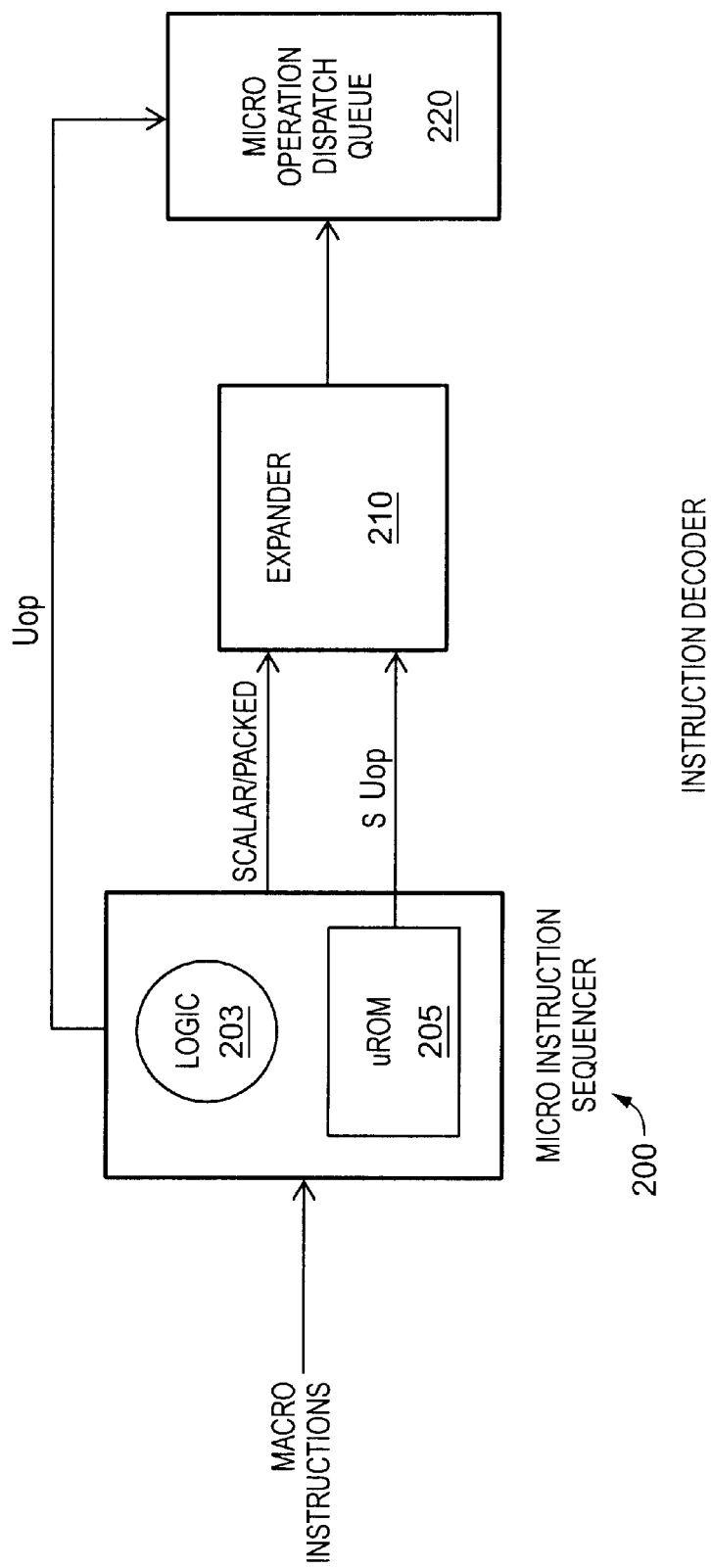
FIG. 2 is a block diagram of an instruction decoder according to one embodiment of the present invention can be implemented.

A block diagram of an instruction decoder is shown in FIG. 2. The instruction decoder converts a macro-instruction into one or more packed or scalar uops.

Macro-Instructions to be operated on by the processor are received by a micro-instruction sequencer (MIS) 200. The MIS logic 203 transforms the macro-instructions into one or more uops and/or Suops by referencing the UROM wherein the applicable uops and Suops are stored. Any regular uops are sent directly to the Micro-operation Dispatch Queue 220 to be stored for processing by the processor's core logic. If one or more Suops are generated, the MIS logic references the macro-instructions operations code (opcode) or any applicable associated information to determine whether the operation to be performed relative to each particular Suop is packed or scalar. An indicator is generated for each Suop to indicate the type of operation, scalar or packed, to be performed by the processor relative to the Suop. Each Suop is sent to an Expander 210 along with the associated indicator. The Expander 210 uses the associated indicator to expand each Suop into one or more uops to perform the scalar or packed operation indicated by the indicator.

Figure 3:
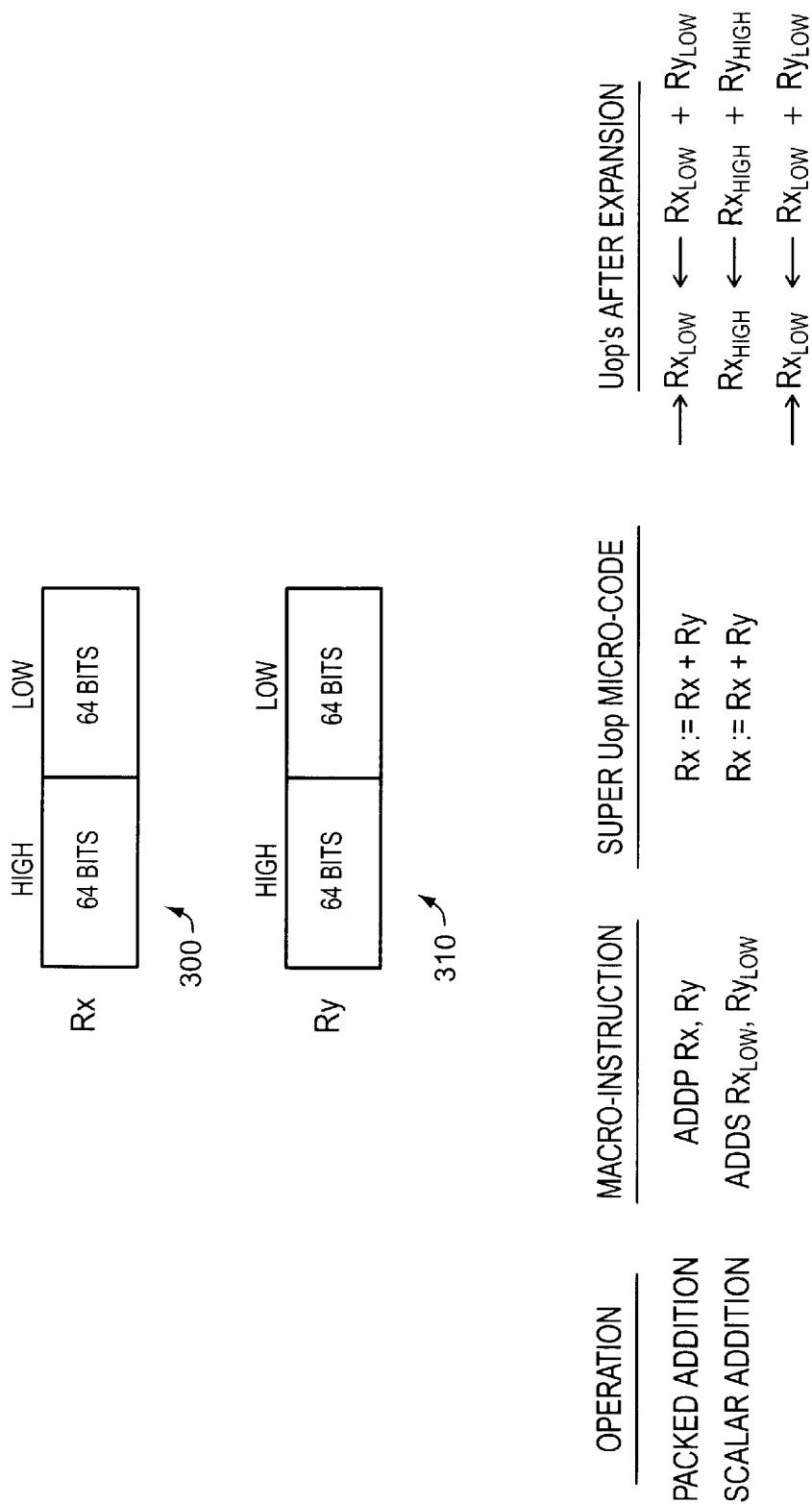
FIG. 3 conceptually illustrates microcode expansion according to one embodiment of the present invention.

FIG. 3 illustrates an exemplary translation of packed and scalar "ADD" operations under KNI, according to one embodiment of the present invention. It is to be noted that the "ADD" function as presented herein is merely one example of the type of operation that may be decoded using an embodiment of the invention. Any other operation that may be represented as packed or scalar may also be decoded by embodiments of the invention. The list of applicable operations includes but is not limited to adding, subtracting, multiplying, and dividing.

Register Rx 300 stores an operand that is typically 128 bits long, with the lower portion of the operand comprised of 64 bits, and the upper portion of the operand consisting of 64 bits. Register Ry 310 typically has the same structure as Rx 300, a lower portion of the register comprised of 64 bits, and an upper potion of the register comprised of 64 bits. In Suop microcode, both the packed addition operation represented by the macro-instruction, ADDP, and the scalar addition operation represented by the macro-instruction, ADDS, are represented by the same Suop micro-code. When either the scalar or the packed addition operation is referenced in the UROM 205 by the MIS logic 203, the same Suop microcode is generated. Since the scalar and packed addition operations are different, they must be translated into uop microcode prior to being processed. The Expander 210 expands the ADDP operation Suop into two uops as listed in figure three relative to an associated indicator indicating a packed operation. Conversely, the Expander 210 expands the ADDs operation Suop into a single uop relative to an indicator indicating a scalar operation. Advantageously, while ADDP and ADDS are implemented differently, both ADDP and ADDS are converted by MIS 200 into the same Suop: Rx:=Rx+Ry. Expander 210 expands the ADDP Suop into microcode instructions that adds all 128 bits of registers Rx 300 and Ry 310, as shown in FIG. 3, whereas ADDS is expanded into microcode that adds only the lower 64 bits of Rx 300 and Ry 310.

Figure 4:
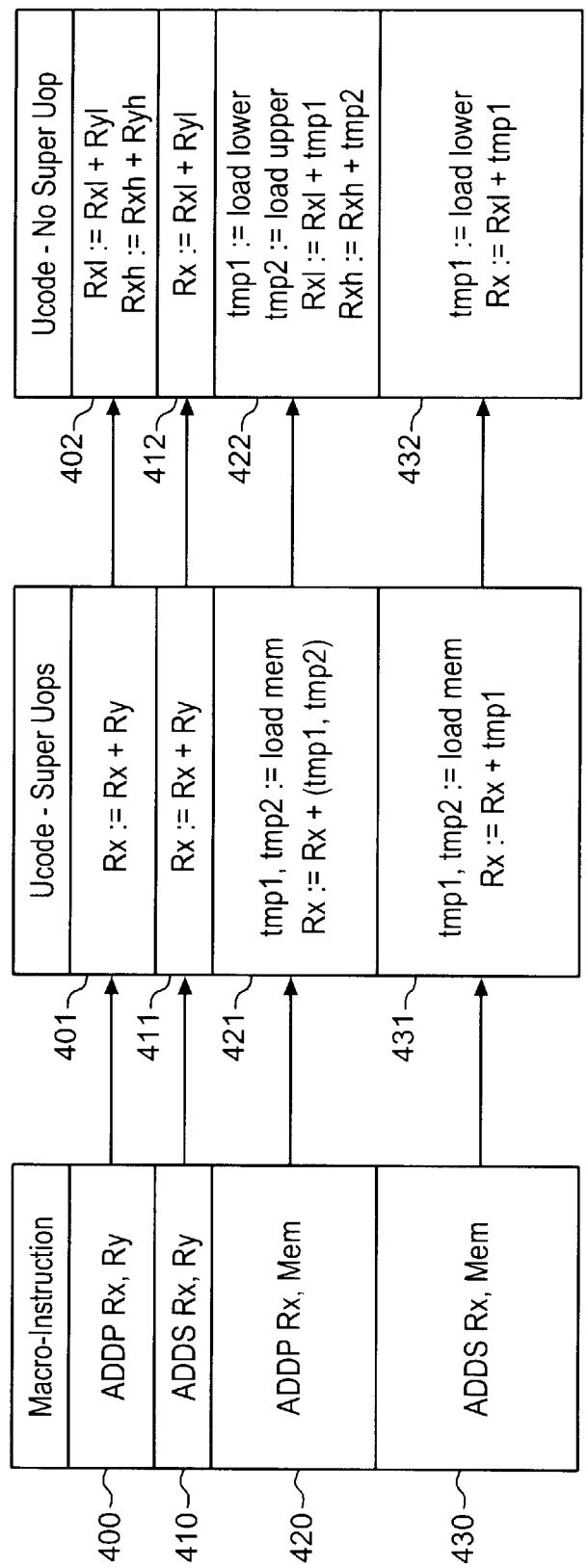
FIG. 4 is a table of Suop implementation examples according to one embodiment of the present invention.

FIG. 4 provides additional examples of an implementation of an embodiment of the invention for various packed and scalar add operations. Macro-instructions to perform packed operation that would require microcode of several uops in the prior art can be represented by a single Suop accompanied by an indicator. The next result is a space savings in the UROM of at least 50% when there is only a single packed operation and a single scalar operation for a particular operand. When there are multiple possible packed operation variants, the savings are potentially even more significant. A Suop is expanded dynamically into one or more uops in a second decoding process that uses the indicator to direct the expansion. For example, packed Macro-Instruction 400 is recognized by MIS 200 as Suop microcode 401. Suop microcode 401 is a single Suop that is expanded by Expander 210 into two uops, namely uop microcode 402. The first uop (Rxl:=Ryl+Ryl) operates on the lower portion of register Rx 300, whereas the second uop (Rxh:=Ryh+Ryh) operates on the upper portion of register Rx 300. Conversely, scalar Macro-Instruction 410 is recognized by MIS 200 as Suop microcode 411, which is identical to Suop 401. However, Suop 411 is expanded by Expander 210 into uop microcode 412, which comprises a single uop, because Macro-Instruction 410 is a scalar instruction that only operates on the lower portion of register Rx 300.

Similarly, packed Macro-Instruction 420 is recognized by MIS 200 as Suop microcode 421. Suop microcode 421 is a double Suop sequence that is expanded by Expander 210 into four uops, namely uop microcode 422. The first uop (tmp1 load lower) and the third uop (Rxl:=Rxl+tmp1) operate on a lower portion of memory location "Mem", and the lower portion of register Rx 300, respectively, whereas the second uop (tmp2:=load upper) and the forth uop (Rxh:=Rxh+tmp2) operate on an upper portion of memory location Mem, and the upper portion of register Rx300, respectively. Conversely, scalar Macro-instruction 430 is recognized by MIS 200 as Suop microcode 431. However, Suop microcode 431 is expanded by Expander 210 into uop microcode 432, which comprises only two uops, half the number of uop microcode 422, because Macro-Instruction 430 is a scalar instruction that only operates on the lower portion of register Rx 300, and the lower portion of memory location Mem.

Persons of skill in the computer arts will appreciate that the novel mechanism of Suops and associated indicators provides several significant advantages over the prior art. First, Suops provide code compaction—where common sequences of instructions are collapsed down into a single sequence of one or more uops, saving both microcode and UROM size.

Secondly, the concept of using Suops allows similar instructions of different types to be collapsed down to a single sequence of one or more uops. This means that different instruction types (e.g., packed and scalar)—can be very compactly represented in the Suop encoding. The particulars of the instruction sequence change depending upon the particular indicator of the instruction.

The preceding description is merely exemplary and is not intended to limit the scope of the invention relative to the claims below. The examples provided herein provide for only one packed variant and one scalar variant for a particular operator, such as the ADD operator discussed above. It is appreciated that there may be more than one type of packed operation. For example, the registry could be divided into four 32 bit blocks instead of 64 bit high and low blocks. A packed variant of an operator could include an operation on any combination of 32 bit blocks of two or more registries, or between a registry and other memory locations. As mentioned, the operator is not limited to addition but may include any number of functions that may be contained in microcode. Additionally, the uop and Suop microcode may be stored in XLAT PLAs instead of UROM directories.

What is claimed is:

1. A computer comprising:
   a first decoder unit to convert an instruction specifying the performance of a packed operation into a first special micro-operation (micro-op, the decoder unit to generate an indicator specifying the packed operation associated with the first special micro-op based on the macro-code contained within the instruction;
   a second decoder unit that expands the first special micro-op into a particular sequence of one or more micro-ops based on the associated indicator of the first special micro-op; and
   an execution unit that executes the particular sequence of one or more micro-ops.

2. The computer of claim 1, wherein the decoder unit is further to convert an instruction specifying the performance of a scalar operation into the first special micro-op and to generate an indicator specifying the scalar operation associated with the first special micro-op.

3. The computer of claim 1, the first decoder unit further comprising:
   a read-only memory (ROM) that stores one or more special micro-ops; and
   logic for selecting the first special micro-op.

4. The computer of claim 1 wherein the first and second decoder units are configured to operate on two instructions in parallel.

5. A computerized method for dynamically expanding microcode routines comprising:
   converting a macro-instruction specifying the performance of a packed operation into a special micro-operation (micro-op) that represents a code sequence;
   generating an indicator specifying the packed operation associated with the special micro-op; and
   expanding the special micro-op into the particular sequence of one or more micro-ops based upon the associated indicator of the macro-instruction.

6. The method according to claim 5 further comprising:
   converting a second macro-instruction specifying the performance of a scalar operation into the special micro-op; and
   generating an indicator specifying the scalar operation associated with the special micro-op.

7. The method according to claim 5 wherein said converting, generating, and expanding are performed in an instruction decoding operation of a computer processor.

8. A decoder for decoding instructions comprising:
   a first decode unit to convert a macro-instruction specifying the performance of a packed operation into a special micro-operation (micro-op) and to generate an associated indicator specifying the packed operation associated with the special micro-op; and
   a second decode unit to expand the special micro-op into a particular sequence of micro-ops based upon the associated indicator.

9. The decoder of claim 8, wherein the first decode unite is further to convert a macro-instruction specifying a scalar operation into the special micro-op.

10. The decoder of claim 8 wherein the first decode unit comprises:
    a first set of logic configured to extract information associated with the indicator from the macro-instructions; and
    a second set of logic to translate the macro-instructions into the special micro-op.

11. The decoder of claim 8, wherein the packed operation comprises at least one of an add operation, a subtract operation, a multiply operation, and a divide operation.

12. A method comprising:
    decoding a macroinstruction into a special micro-operation (micro-op) that represents a code sequence generic to a set of multiple variant macroinstructions, the multiple variant microinstructions including instructions for performing scalar and packed operations on operands, a scalar operation being an operation that operates on a single set of operands at a time, and a packed operation being an operation that two or more sets of operands are acted upon simultaneously;
    generating an indicator associated with the special micro-op that indicates a particular variant of the set of multiple variant macroinstructions; and
    converting the special micro-op into one or more micro-ops to perform the particular variant of the set of multiple variant macroinstructions based upon the indicator.

13. The method of claim 12, wherein the packed and the scalar operations each comprise at least one of an add operation, a subtract operation, a multiply operation, and a divide operation.

14. The method of claim 12, wherein the decoding, generating, and converting are performed in an instruction decoding operation of a computer processor.

* * * * *

UNITED STATES PATENT AND TRADEMARK OFFICE
CERTIFICATE OF CORRECTION

PATENT NO. : 6,581,154 B1
DATED : June 17, 2003
INVENTOR(S) : Zaidi

It is certified that error appears in the above-identified patent and that said Letters Patent is hereby corrected as shown below:

Column 4,
Line 57, delete "(Rxl:=Ryl+Ryl)", insert -- (Rxl:=Rxl+Ryl) --.
Line 59, delete "(Rxh:=Ryh+Ryh)", insert -- (Rxh:=Rxh+Ryh) --.

Signed and Sealed this

Twenty-fifth Day of November, 2003

JAMES E. ROGAN
*Director of the United States Patent and Trademark Office*